Dec. 31, 1968  I. C. McKECHNIE ET AL  3,419,834
ELECTRICAL COILS

Filed March 24, 1966

INVENTORS
IAN C. McKECHNIE
LESTER E. OLIPHANT

BY *M K Murphy*
ATTORNEY

INVENTORS
IAN C. McKECHNIE
LESTER E. OLIPHANT

United States Patent Office 3,419,834
Patented Dec. 31, 1968

3,419,834
ELECTRICAL COILS
Ian C. McKechnie, 16254 Meyers, and Lester E. Oliphant, 16561 Lindsay, both of Detroit, Mich. 48235
Filed Mar. 24, 1966, Ser. No. 537,092
9 Claims. (Cl. 336—69)

ABSTRACT OF THE DISCLOSURE

Transformer coils are formed of flat metal plates and positioned with a dielectric material between the parallel surfaces of juxtaposed coils. The capacitance and inductance between the coils can be determined by proper choice of the dimensions of the elements.

---

The invention relates to electrical coils and more particularly to electric coils capable of storing substantially large amounts of dielectric potential energy, while still being capable of storing the usual amount of magnetic potential energy.

Electric coils found in the prior art and having both capabilities of dielectric and magnetic storage qualities have been built from ribbon or foil conductors wound in spool fashion. From this type of construction result physical limitations which generally prevent obtaining the desired capabilities of inductance, capacitance and current carrying abilities.

The limitations of the prior art electric coils are overcome by the present invention, with the result that any desired combinations of inductance, capacitance and current carrying abilities can be combined in one electrical assembly. Another shortcoming of previous art coils making it impractical to transfer large amounts of dielectric, or capacitance, energy from one electrically insulated coil to others in the same assembly, is overcome by the present invention. By proper physical dimensioning of the coils and by proper choice of the coil areas juxtaposed with each other in one physical assembly, any desired amount of dielectric energy can be transferred from one coil to the others in addition to the normal transfer of energy by magnetic flux linkage. Consequently, the new coil construction of the invention finds many uses in electrical circuits that require combinations of inductance and capacitance since both qualities can be combined in one electrical assembly, and such inductance and capacitance qualities can be usefully fashioned according to the circuit characteristics to be achieved. For example, it now becomes feasible to obtain a resonant circuit through the use of electric coil assemblies according to the invention, without any necessity of providing the circuit with ordinary self-inductor coils and capacitors.

The use of electric coil assemblies according to the teachings of the invention also opens up a completely new concept of electrical transformer designs in which resonance can be established, if so desired, without the necessity of connecting external capacitors into the circuit. In addition, large amounts of dielectric energy can be transferred between electrically insulated coils of any turn ratio forming the primary of the transformer to any plurality of electrically insulated coils of a different turn ratio forming the secondary of the transformer, simultaneously with transfer of magnetically inducted energy present in electrical transformers.

One object of the invention, consequently, is to provide an electrical winding assembly including one or more coil windings endowed with dielectric, or capacitance, storage capability in addition to the usual magnetic storage and current conducting capabilities.

Another object of the invention is to provide an electrical winding assembly including individual coil windings that can be tailored to transfer any amount of capacitance energy from one coil to the others in addition to transferring electro-magnetic energy in the usual manner.

A further object of the invention is to provide electrical transformers made up of individual spirally wound coils having a predetermined turn ratio which are interconnected so as to define a primary and a secondary winding for the transformer, and which permit capacitance transfer of energy from one coil to the others in addition to the usual transfer of energy by magnetic flux variations.

Another object of the invention is to provide a method for obtaining spirally wound substantially uniplanar coils endowed with the above mentioned qualities and which may be assembled together to provide self-inductance coils or electrical transformers according to a "building block" system, i.e. a method permitting use of standard spirally wound uniplanar coils disposed in sandwich-like fashion with layers of dielectric material interposed between consecutive coils, individual coils being interconnected in any appropriate manner such as in series, in parallel, or in series-parallel, so as to form one or more electrical circuits with any appropriate capacitance and magnetic couplings between the individual coils.

Yet another object of the invention is to provide electrical winding assemblies having well defined characteristics of inductive and capacitive qualities so as to eliminate in most applications the requirement of providing auxiliary inductors and capacitors connected to the electrical circuit.

Yet a further object of the invention is to accomplish the above mentioned object by utilizing simple low cost individual components consisting of substantially flat, spirally wound, single-layer coils made of substantially ribbon-like conductors which may be obtained by vacuum deposition, electrolytic deposition, etching, stamping, etc.

Yet a further object of the invention is to provide means for carrying away any heat generated by an assembly of electrical winding coils made according to the invention.

Other objects and advantages of the invention will become apparent when the following specification is considered in connection with the accompanying drawings, wherein.

Referring now the drawings, and more particularly to

Figure 1:
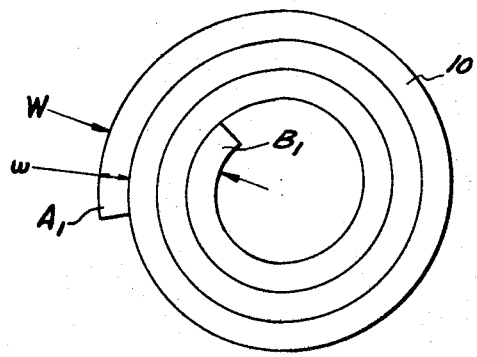
FIG. 1 is a schematic representation of a spirally wound single-layer substantially uniplanar coil made according to the principle of the invention.

FIG. 1 thereof, a spirally wound, substantially uniplanar, single-layer coil 10 is shown provided with three turns, for the sake of illustration only, having two ends identified respectively as $A_1$ and $B_1$. The coil 10 is made of a substantially flat conductor having a width $w$ and a thickness $t$. The width $w$ of the conductor may be arbitrarily chosen, and it is evident that the total width W of the coil can be as desired so that the area defined by the total length of the flat conductor having a width $w$ can be as large or as small as desired. It is also evident that the cross-sectional area of the conductor ($w \times t$) determines the current carrying capacity of the coil 10.

Figure 2:
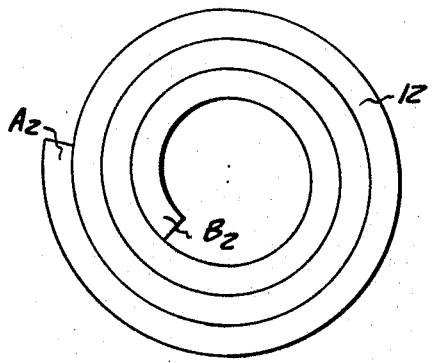
FIG. 2 is a schematic representation of an electrical coil similar to the coil of FIG. 1, but shown upside-down.

FIG. 2 represents a coil 12, substantially identical to the coil 10 of FIG. 1, but turned upside-down relatively thereto. The coil 12 is provided with two terminal ends designated respectively $A_2$ and $B_2$. If the coil 10 and the coil 12 of FIG. 2 are closely juxtaposed in parallel planes, with a layer of appropriate dielectric material interposed therebetween, the resulting assembly resembles the coil assembly 13, of the FIG. 3. If the terminal ends $B_1$ of coil 10 and $B_2$ of coil 12 are connected together, the coil assembly 13 is provided with two separate terminals $A_1$ and $A_2$ forming a winding assembly comprising six turns wound in the same direction, three turns being disposed in one plane (coil 10) and three turns being disposed in a parallel plane (coil 12).

The inductance L developed by each individual uniplanar coil is determined by the well known formula:

$$L = \frac{(rN)^2}{8r + 11W}$$

wherein:

L=self inductance in microhenrys,
N=total number of turns,
$r$=mean radius in inches (FIGS. 1 and 2),
W=width of coil in inches.

The capacitance between coils 10 and 12 is given by the usual formula:

$$C = 0.224 \frac{KS(N-1)}{d}$$

wherein

C=capacitance in mmfd.;
K=dielectric constant, depending from the dielectric material used to insulate coil 10 from coil 12,
S=area of one coil in square inches,
N=number of individual spirally wound coils; and
$d$=thickness of the dielectric in inches.

It can thus be seen that by connecting any number of coils disposed in juxtaposed parallel planes, the total inductance and the total capacitance can be determined by proper choice of the dimensions of the elements.

Figure 3:
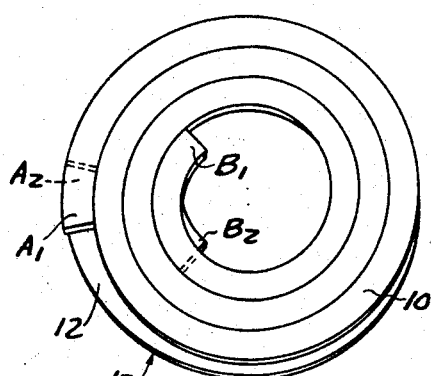
FIG. 3 is a schematic representation of an electrical winding assembly comprising the coils of FIGS. 1 and 2.

It is apparent that the individual coils may be connected in any manner whatsoever, instead of being connected in series as shown in FIG. 3, such connections being either a series, parallel, or any series-parallel combination. It is also apparent that individual coils may be connected in such a manner that their respective turns, or any group of turns, may be wound in the same direction and be added to each other, or the turns may be wound in opposite direction, such as would result if two coils, for example, as coil 10 of FIG. 1, were disposed in juxtaposed parallel planes, with a layer of dielectric interposed therebetween, and that the terminals $B_1$ were interconnected and the terminals $A_1$ remained unconnected so as to form a winding assembly having a total of six turns wound three turns in opposition to three other turns. All the individual coils may have the same number of turns, or they may have different number of turns, and a plurality of individual coils of a given number of turns may be connected together so as to form the primary of an electrical transformer, with the secondary thereof being formed by a plurality of coils having the desired number of turns providing the proper turn ratio for the transformer and appropriate potential transfer and impedance matching. Because of the transfer of energy resulting from the capacitance developed by winding coils by the present invention, the efficiency of such a transformer is considerably enhanced in view of such capacitance coupling being in addition to the usual magnetic coupling. Also, resonant circuits can be easily designed with "built-in" inductance and capacitance so that auxiliary inductors and capacitors may be omitted.

Figure 4:
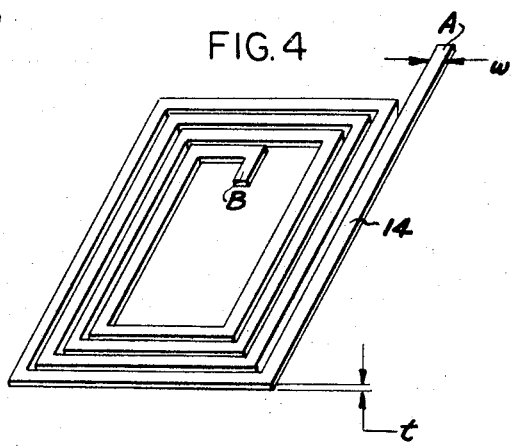
FIG. 4 is another representation of a spirally wound single-layer uniplanar coil made according to the principle of the invention, such coil being provided with a four turn ratio for illustrative purposes.
Figure 5:
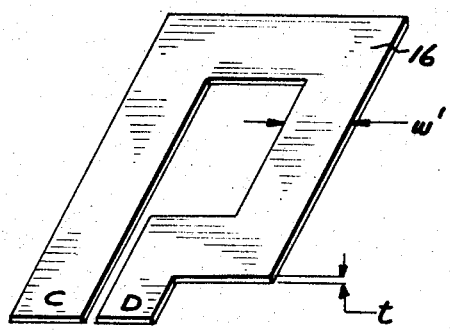
FIG. 5 is a schematic representation of a spirally wound single-layer uniplanar coil having one turn.

An example of an electrical transformer utilizing electrical winding coils according to the invention is schematically represented in FIGS. 4–8. FIG. 4 shows a spirally wound single-layer coil, substantially uniplanar, and consisting of a conductor having a width $w$ and a thickness $t$. The conductor is spirally wound so as to be provided with a terminal end A and a terminal end B. As shown, the coil is preferably of a rectangular shape, and may consist of any number of turns, four turns being shown here for illustrative purposes. FIG. 5 represents a one turn coil 16 consisting of a substantially wide conductor having a width $w'$ which may preferably be about four times the width $w$ of the conductor of coil 14 of FIG. 4. The conductor of coil 16 has a thickness $t$ which may be the same thickness as the conductor forming coil 14, although it is evident that other thicknesses may be used as desired. The coil 16 is provided with two terminal ends designated respectively C and D.

The effective area of coil 14 is preferably substantially equal to the effective area of coil 16, and several coils 14 may be disposed in parallel planes with several coils 16 disposed betwen consecutive coils 14, with adequate dielectric layers between consecutive coils in order to provide appropriate electrical insulation. With an appropriate iron core to provide efficient magnetic coupling between the coils, such an assembly, by proper electrical interconnection of all the coils 14 together and of all the coils 16 together, form an electrical transformer having well designed electromagnetic, inductive and capacitive qualities, and provided with a turn ratio of 4 to 1.

Figure 6:
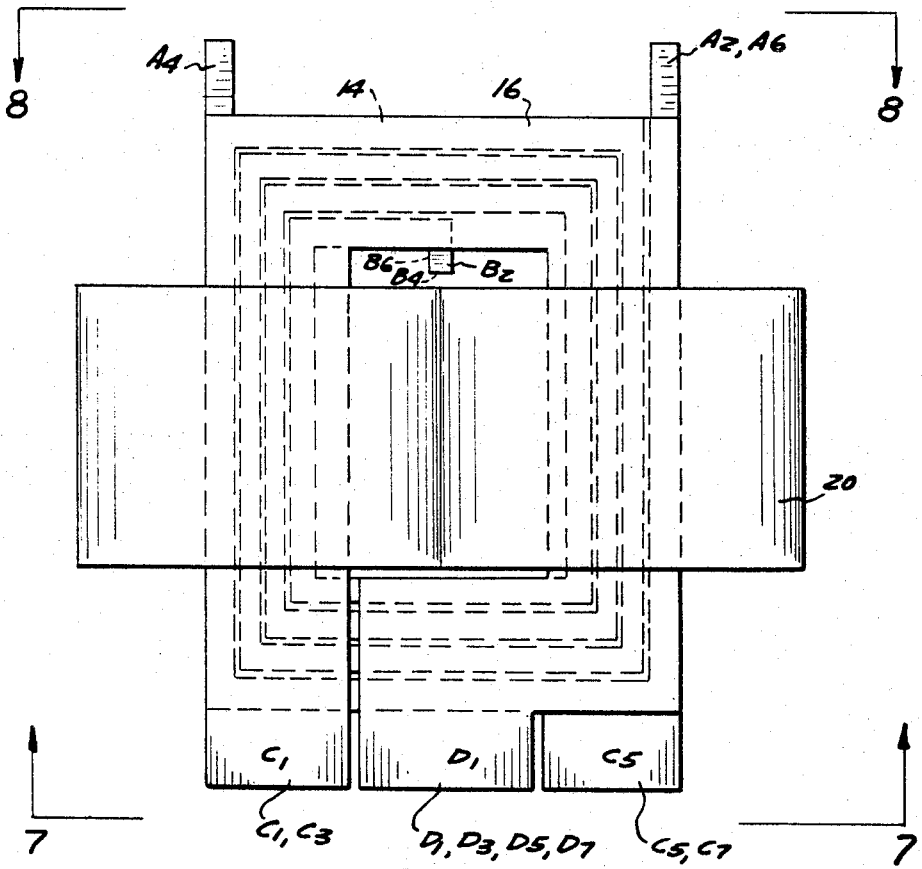
FIG. 6 is a top plan view of a transformer including an electrical winding assembly comprising several of the coils of FIGS. 4 and 5.
Figure 7:
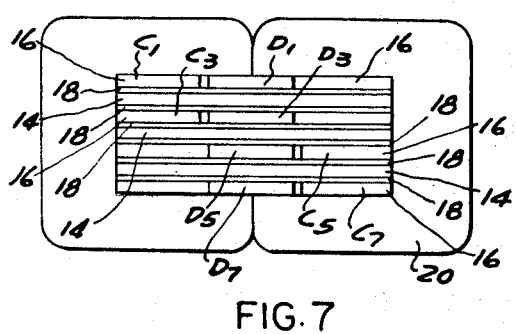
FIG. 7 is an end view of the electrical transformer of FIG. 6 as seen from line 7—7 of FIG. 6.
Figure 8:
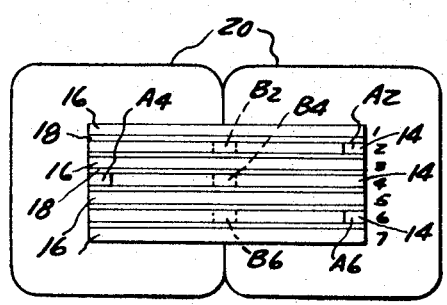
FIG. 8 is another end view of the electrical transformer of FIG. 6 as seen from line 8—8 of FIG. 6.

An example of such a transformer is schematically represented in FIGS. 6–8. Four coils 16 are closely juxtaposed with three coils 14, a layer 18 of insulating dielectric material being disposed between consecutive coils for providing adequate electrical insulation. The sandwich-like assembly is provided with an iron core and, as shown for illustrative purposes only, the odd numbered coils—coils 1, 3, 5 and 7—consist of windings made according to coil 16 of FIG. 5, and the even numbered coils 2, 4 and 6, consist of windings made according to coil 14 of FIG. 4. The terminals of the first coil are designated $C_1$ and $D_2$, the terminals of second coils are designated $A_3$ and $B_2$, the terminals of the third coil are designated $C_3$ and $D_3$, etc.

Terminals $C_1$ and $C_3$ and terminals $D_1$ and $D_3$ are connected together, so that coils 1 and 3 are in parallel. Terminals $C_5$ and $C_7$ and terminals $D_5$ and $D_7$ are connected together so that coils 5 and 7 are turned upside down in relation to coils 1 and 3. The common terminals $D_1$ and $D_3$ are connected to common terminals $D_5$ and $D_7$ so that the coils 1, 3, 5 and 7 are now connected in series-parallel with common terminals $C_1$ and $C_3$ available for connection to one end of an electrical circuit, and common terminals $C_5$ and $C_7$ are available for connection to the other end of the circuit. The total number of turns of the winding assembly consisting of 1, 3, 5 and 7 is 2 turns.

Coils 2, 4 and 6 consist of three windings such as coil 14 of FIG. 4, and those coils are disposed so that coil 2 is with its terminal $A_2$ on the right-hand side as shown in FIG. 7, coil 4 is upside-down as compared to coil 2 so that its terminal end $A_4$ is on the left-hand side, and coil 6 is disposed with the same orientation as coil 2 so that its terminal $A_6$ is also disposed on a right-hand side of FIG. 6. If terminal $B_2$ of coil 2 is connected to terminal $B_4$ of coil 4, and terminal $A_2$ is connected to terminal $A_6$, the whole assembly consists of the three coils 2, 4 and 6 connected in series having a total of 12 turns having free terminals $A_4$ and $B_6$ for connection to an appropriate circuit. It is evident that the turn ratio of the transformer is 6 to 1. It is to be appreciated that any other turn ratios may be obtained and that any other disposition of the individual coils are contemplated by the invention so as to provide for any appropriate tap at the primary of the transformer as well as at the secondary for determining any appropriate turn ratio with any adequate built-in inductance and capacitance in the primary as well as in the secondary.

Figure 9:
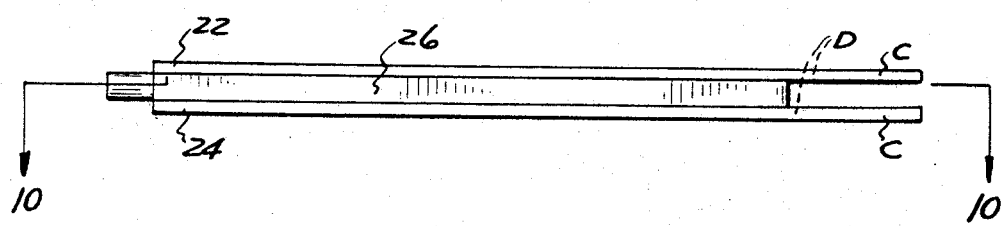
FIG. 9 is a schematic representation of an example of cooling means for carrying away any heat generated by an electrical winding assembly according to the principle of the invention.

An electrical winding assembly according to the present invention may be easily provided with cooling means so as to be able to operate at high current densities. An example of such cooling means is represented in FIGS. 9–10 wherein two single layer substantially uniplanar coils 22 and 24 are shown disposed in parallel planes with a layer 26 of dielectric material disposed therebetween for providing adequate electric insulation.

Figure 10:
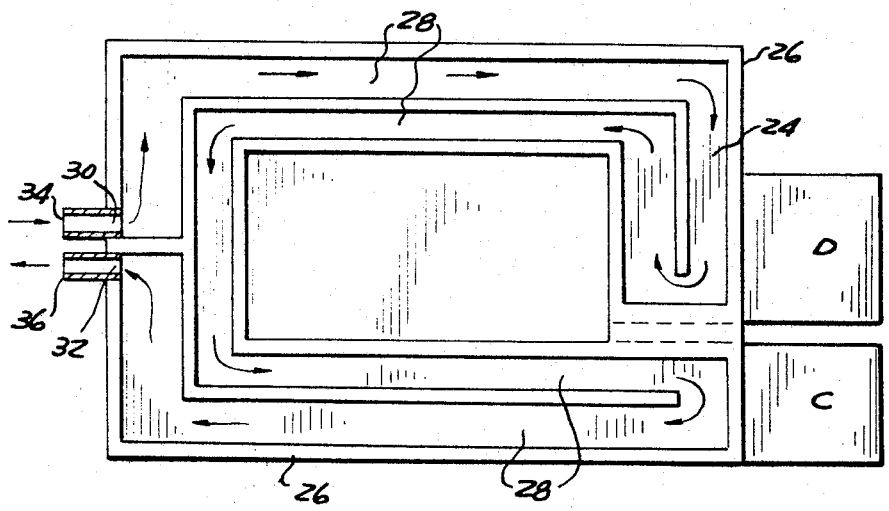
FIG. 10 is a cross-sectional view of the cooling means shown in FIG. 9 as seen from line 10—10 of FIG. 9.

As best seen in FIG. 10, the insulation layer 26 is provided with a plurality of channels or passageways 28 having an inlet 30 and an outlet 32. Adequate fittings 34 and 36 are connected to the inlet 30 and outlet 32 for connection to a source of coolant fluid, not shown, and coolant fluid is circulated between the coils 22 and 24 so as to carry away the heat generated during operation at high current densities. Such coolant fluid may consist of air, gas, pure water or preferably of dielectric oil such as used in industrial transformers. The hot coolant flowing from the outlet 32 is directed to an adequate heat exchanger, as according to principles known in the art.

It is apparent that the foregoing description is to be construed as being merely illustrative of the principle of the present invention, and that many embodiments and combinations of elements will become readily apparent to those skilled in the art without departing from the precepts and scope of the invention.

What is claimed as new is:

1. Transformer coil structure which comprises
a primary coil element and a secondary coil element each of which is formed of a single thickness of a thin substantially flat plate of metal,
one of said coil elements having a plurality of turns spirally disposed in the plane of its respective plate,
the other of said coil elements having a single turn,
each of said coil elements having a central core-receiving opening,
said plurality of turns having overall dimensions between the respective opening and periphery thereof which are not substantially greater than the corresponding overall dimensions of said single turn between the respective opening and periphery thereof,
said coil elements being mutually axially superposed with their openings aligned and the planes thereof substantially parallel,
and a layer of dielectric material sandwiched between said coil elements.

2. The structure defined in claim 1 wherein said overall dimensions of plurality of turns are substantially equal to said corresponding overall dimensions of said single turn.

3. The structure defined in claim 1 wherein said turns have rectangular shape with sides and ends, said overall dimension of the sides of each coil element being substantially equal to said overall dimension of the ends thereof.

4. The structure defined in claim 1 wherein there are a plurality of said primary and secondary coil elements which are stacked in said superposed relation and in alternate arrangement, a layer of said dielectric material being sandwiched between each adjacent pair of coil elements in the stack.

5. The structure defined in claim 1 wherein each of said turns of said one coil element has a width in said plane which is greater than the combined thicknesses of said plates.

6. The structure defined in claim 5 wherein said width is greater than the combined thicknesses of said plates and layer of dielectric material.

7. The structure defined in claim 1 wherein said one coil element comprises said primary coil element.

8. The structure defined in claim 1 wherein said one coil element comprises said primary coil element, said turns having rectangular shape with sides and ends, said overall dimension of the sides of each coil element being substantially equal to said overall dimension of the ends thereof, each of said turns of said one coil element having a width in said plane which is greater than the combined thicknesses of said plates and layer of dielectric material.

9. A transformer having a pair of input terminals and a pair of output terminals and adapted to be connected in circuit with a source of electrical energy and a load to provide a predetermined inductance and capacitance in said circuit comprising,
a primary coil element and a secondary coil element each of which is formed of a single thickness of a substantially flat plate of metal,
one of said coil elements having a plurality of turns spirally disposed in the plane of its respective plate to form a flat spiral,
the other of said coil elements having a single turn disposed in the plane of its respective plate,
each of said coil elements having a central core-receiving opening,
said coil elements being mutually axially superposed with their openings aligned and with the planes thereof substantially parallel, a layer of dielectric material disposed between said coil elements,
a first of said coil elements having two ends thereof serving as said input terminals and providing an uninterrupted current path between said input terminals through said first coil element,
a second of said coil elements having two ends thereof serving as said output terminals and providing an uninterrupted current path between said output terminals through said second coil element,
said one coil element having overall dimensions between the respective opening and periphery thereof which are not substantially greater than the corresponding overall dimensions of said other coil element between the respective opening and periphery thereof,
said turns of said one coil element having a dimension in the plane of its respective plate correlated to the overall dimension of said other coil element to provide said predetermined capacitance in said circuit.

References Cited

UNITED STATES PATENTS

| | | | |
|---|---|---|---|
| 1,389,255 | 8/1921 | McDonald | 336—232 X |
| 2,666,254 | 1/1954 | Eisler | 336—200 X |
| 2,850,707 | 9/1958 | Wroblewski et al. | 336—232 X |
| 2,853,657 | 9/1958 | Hofacker | 336—60 X |

LARAMIE E. ASKIN, *Primary Examiner.*

DAVID A. TONE, *Assistant Examiner.*

U.S. Cl. X.R.

336—60, 232